United States Patent [19]

Talkin et al.

[11] 3,813,920

[45] June 4, 1974

[54] MATCHED ACOUSTIC GENERATOR

[75] Inventors: Albert I. Talkin, Bethesda; Kenji Toda, Rockville; Gary L. Roffman, Silver Spring, all of Md.

[73] Assignee: The United States of America as represented by the Secretary of the Army, Washington, D.C.

[22] Filed: Apr. 28, 1972

[21] Appl. No.: 248,480

[52] U.S. Cl............... 73/37, 73/432 R, 116/137 A
[51] Int. Cl. .......................................... G10k 10/00
[58] Field of Search........... 73/4 R, 37, 40.5 A, 168, 73/388 R, 389, 432 R, 1 DV; 116/137 A

[56] References Cited
UNITED STATES PATENTS

| | | | |
|---|---|---|---|
| 3,264,861 | 8/1966 | Miles | 73/4 R |
| 3,590,626 | 7/1971 | Hugli | 73/4 R |

*Primary Examiner*—Charles A. Ruehl
*Attorney, Agent, or Firm*—Edward J. Kelly; Herbert Berl; Saul Elbaum

[57] ABSTRACT

An apparatus is provided for frequency sweep testing of the insertion power gain of flueric proportional amplifiers and passive components. This generator enables a rapid measurement of insertion power gain by pressure measurement only. In this apparatus two transmission lines of acoustic tubing, opened or closed at the far ends are fed acoustic power by an acoustic source sufficiently isolated from said tubing such that power input into each respective tube is independent of the line terminations. The transmission lines are of sufficient length such that the pressure at the input orifice is independent of the termination over the frequency range of interest. One of a matched pair of pressure transducers is located in the periphery of each transmission tube. An electronic feed back loop maintains pressure in one tube constant regardless of the frequency of the acoustic source. The device to be tested is interposed between the input orifice of the tube without the feed back loop and the pressure transducer connected to that tube. The feed back loop tube maintains the pressure at the undisturbed tube constant. The square of the ratio of the pressure reading of the pressure transducer in the tube containing the test device to the reading of the undisturbed tube is the insertion power gain of the device under test.

11 Claims, 7 Drawing Figures

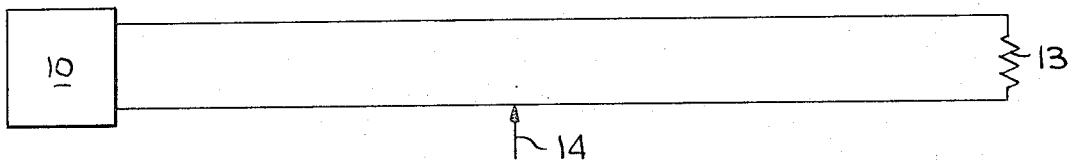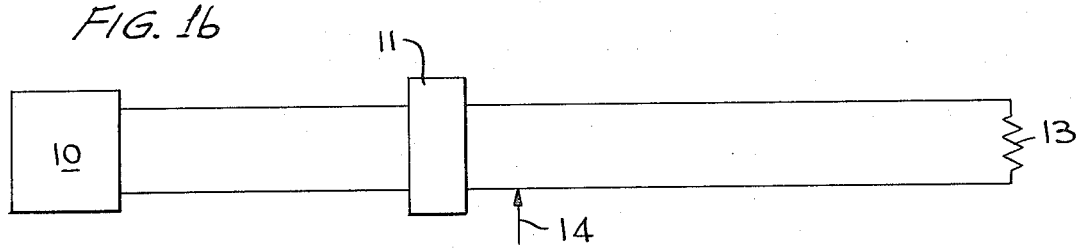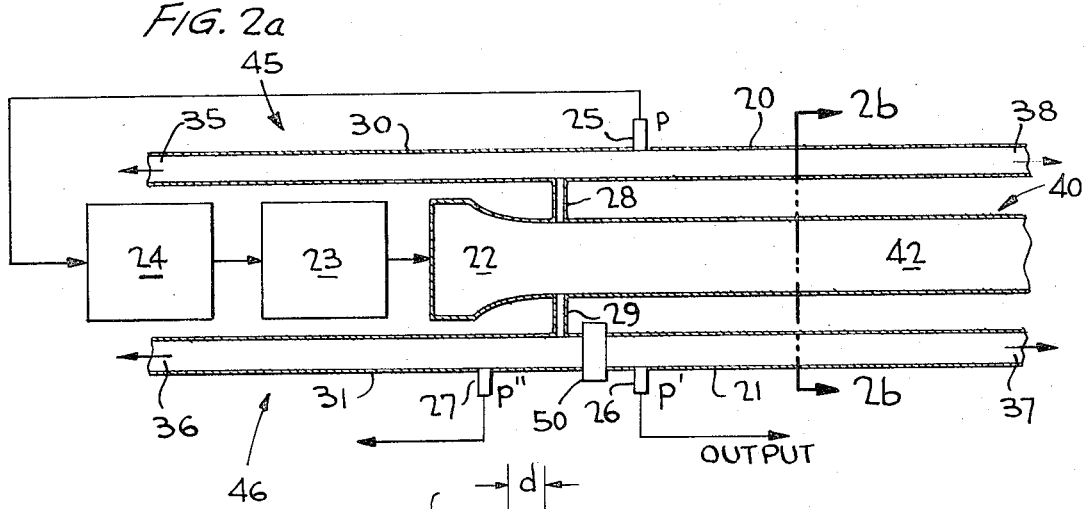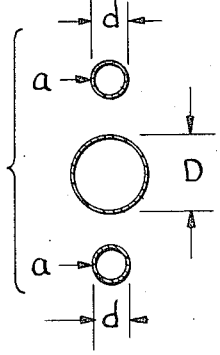

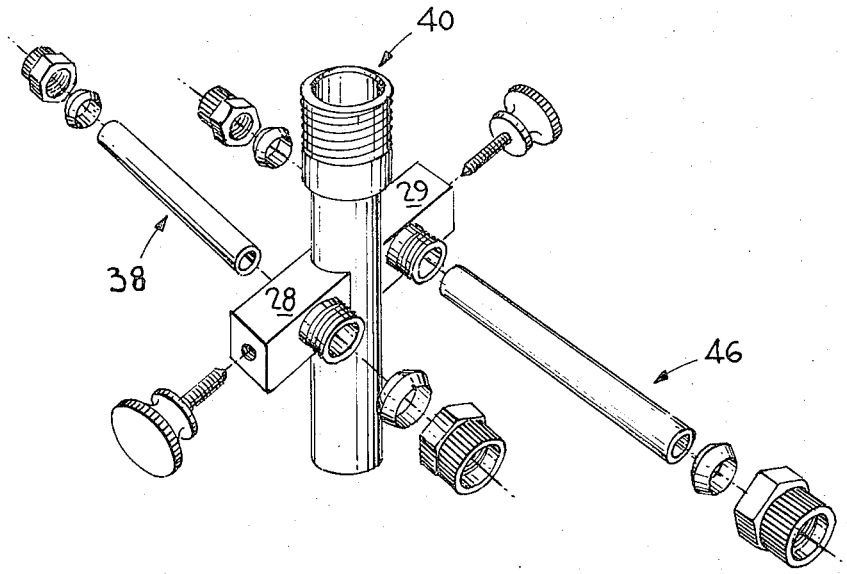
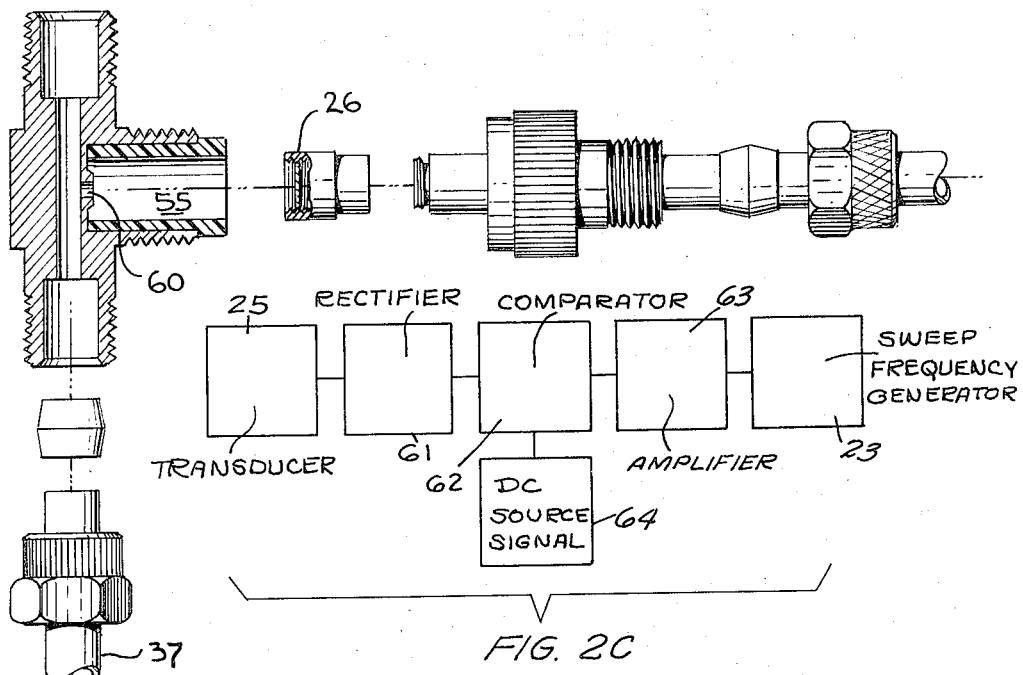

MATCHED ACOUSTIC GENERATOR

RIGHTS OF GOVERNMENT

The invention describe herein may be manufactured, used, and licensed by or for United States Government for governmental purposes without the payment to the inventor of any royalties thereon.

BACKGROUND OF THE INVENTION

This invention relates generally to an apparatus for the measurement of insertion power gain of flueric proportional amplifiers over a frequency range of approximately 5 octaves. The most important feature of this apparatus is that it enables the rapid measurement of insertion power gain by pressure measurement only. This type measurement eliminates the necessity of making laborious flow measurements which require constant current or constant temperature anemometer bridges and calibration curves.

The discovery and development of the flueric proportional amplifier has created a need for streamline techniques to measure the power gain and bandwidth of these units. Several investigators have made dynamic measurements of a proportional amplifier. Two primary methods are used: (1) obtaining the admittance matrices of the amplifier ports by measuring pressure and volume flow using piezoelectric transducers and hot wire anemometery, (2) measuring the wave scattering matrices using acoustic level signals with a tunable standing wave tube and piezoelectric transducers. Either of these methods, though rather time consuming provide data that enables the fluid circuit designer to compute a power gain for the unit. Neither of these methods enables a quick figure of merit type assessment. It is a primary purpose of this invention to provide an apparatus for measuring the insertion gain of proportional flueric amplifiers and elements without flow measurement and without tuning.

BRIEF DESCRIPTION OF THE DRAWINGS

FIGS. 1a and 1b are diagrams for defining insertion power gain.

FIG. 2a is a functional schematic of the Matched Acoustic Generator.

FIG. 2b is a cross section of the apparatus of FIG. 2a along the line 2b – 2b.

FIG. 2c is a block diagram of the matched acoustic generator.

FIG. 3 is a exploded view of the coupling unit.

Fig. 4 is a drawing of the transducer holder.

DESCRIPTION OF THE PREFERRED EMBODIMENT

The apparatus of the present invention will be easily understood in its broad aspects by reference to FIGS. 1a and 1b wherein there is shown a diagram for defining insertion power gain. Insertion power gain is usually defined with reference to a transmission line. FIG. 1a shows a transmission line matched at both the sending end and receiving end with respect to a reference point 14 along the line. FIG. 1b shows the same line cut at 14 with an amplifier inserted at 14. The ratio of the sinusoidal power measured at 14 in FIG. 1b to that measured at 14 in FIG. 1a is the insertion power gain of the amplifier or any passive device under test. Should the amplifier have an input impedance matched to the input line and an output impedance matched to the output line the measurement yields the true power gain of the device. In the unmatched situation the gain is referred to as insertion power gain and is, of course, a lower bound for the true power gain.

Shown in FIGS. 2a, 2b, and 2e is a functional diagram of the Matched Acoustic Generator. The infinite transmission lines 20, 30, 21, 31 are in practice 100 foot (30 meter) coils of hollow tubing either opened or closed at the far ends 35, 36, 38, and 37 because the signal continuation in such a length is sufficiently great to make the pressure at the input orifices 29, and 28 independent of the termination over the frequency range of interest. A large acoustic signal is delivered directly to the center transmission line 42 (driving line) by a 100 watt public address acoustic driver. Two matched orifices 28 and 29 channel small but equal fractions of the energy from the center line 42 into the upper arms 20 and 30 and lower arms 31 and 21. The pressure transducer at point P monitors the pressure that would exist at P' if there were no amplifier 50 inserted into the lower arm 21, by the strategem of actually making the measurement at point P of the upper line 20. The rectified output of the upper pressure transducer 25 from recifier 61 is compared by comparator 62 with a preset DC voltage signal 60 and then said comparator 62 supplies the difference of said signal 60 and said output to amplifier 63 and then the output signal from said amplifier 63 is used to set the level or drive the output of the sweep frequency generator 23. These electronic functions are incorporated into a feedback loop and comprise electronic control means 24 indicated in FIG. 2a. This feed back maintains the pressure at point P constant as the frequency is swept from 200 to 5,000 Hz. The squared ratio of the pressure reading of the pressure transducer at point P' to the pressure transducer at point P is the insertion power gain of the amplifier 50 under test. An additional feature of this apparatus is that by placing a pressure transducer at point P'' and subtracting the readings at point P and at point P'' the signal reflected from the input of the amplifier 50 is obtained. The distances of point P and point P'' from the orfices 28 and 29, respectively, must be equal and reasonably short so that line attenuation may be neglected. Viewing the difference of the pressures measured at point P'' and at P' on a sweep frequency display gives an immediate evaluation of the degree of mis-match over the frequency range.

The following precaution must be taken in order to insure that the device will work at its optimum 1. The coupling orifices to the upper tube 45 and the lower tube 46 must be identical so that readings obtained at P and at point P' without the amplifier 50, are identical.

2. The ratio of the area of the cross section of the central pipe 40 to the area of the cross section of an orifice and the ratio of the cross section of either tube 45 or 46 to the area of the cross section of one of the orifices or orifices must be sufficiently large such that the orifice represents a negligible shunting impedance a cross any of the transmission tubes, i.e., tubes 45 and 46.

3. Sufficient acoustic power must be available from the driver to provide useful signal to noise ratios in the presence of the necessarily large orifice attenuations.

4. Attachment of the monitoring pressure transducers must not produce any significant discontinuity in the transmission tubes 45 and 46.

An exploded view of the coupling unit is illustrated in FIG. 3.

FIG. 4 is a drawing of the pressure transducer holder designed to minimize discontinuities in the transmission tubes 45 and 46. The pressure transducer holders and the transmission tubes 45 and 46 have identical internal diameters. The pressure transducers measure the pressure in a cavity connected to the transmission tube by a small hole 60. This hole 60 and a volume 55 in front of the pressure transducer 56 are molded as a Helmholtz resonator. The resonant frequency is 24,500 Hz.

It is to be noted that the acoustic signal source 22 may be replaced by a signal acoustic source that produces a pulse modulated carrier signal. This type of signal is useful for studying the transient response of amplifiers and for testing pulse carrier systems. This acoustic matched impedance generator provides measurements with an estimated error of less than 5 percent.

The inventor wishes it to be understood that he does not desire to be limited to the exact details of construction shown and described herein, for obvious modifications will occur to a person skilled in the art.

What is claimed is:

1. A matched acoustic generator comprising;
    a. An acoustic source connected to a long pipe having two small orifices in the side thereof and each located an equal distance from said source;
    b. A first long tube having a first middle and peripherally connected at said middle to one said orifice;
    c. Said first tube comprising a first arm and a second arm which extends from said first middle;
    d. A second long tube having a second middle and peripherally connected at said second middle to another said orifice;
    e. Said second tube comprising a third arm and a fourth arm which extends from said second middle;
    f. Said first arm comprising a first peripheral outlet;
    g. A first pressure transducer connected to said first outlet;
    h. Said third arm comprising a second peripheral outlet;
    i. A second pressure transducer connected to said second outlet;
    j. A means for interposing an acoustic test device onto said third arm in between a proximate orifice and a proximate pressure transducer;
    k. Said first pressure transducer and said second pressure transducer each located an equal distance away from a proximate orifice; and
    l. An electrical control means for maintaining constant pressure at said first pressure transducer.

2. The matched acoustic generator of claim 1 wherein said electronic control means comprises a feedback loop.

3. The matched acoustic generator of claim 2 wherein said feedback loop comprises
    a sweep frequency generator and wherein
    said acoustic source is electrically driven by said sweep frequency generator.

4. The matched acoustic generator of claim 3 wherein said feedback loop further comprises means for rectifying the output signal from said first transducer, means for comparing the rectified signal with a predetermined direct current signal, means for amplifying the difference between said signal and said predetermined direct current signal, and means for feeding said amplified difference to said sweep frequency generator to set the output power level of said sweep frequency generator.

5. The matched acoustic generator of claim 4 wherein said first transducer and said second transducer are a matched pair.

6. The matched acoustic generator of claim 5 further comprising a third pressure transducer located in the periphery of said fourth arm a distance away from the proximate orifice of said fourth arm equal to the distance of said second transducer away from last said orifice.

7. The matched acoustic generator of claim 6 wherein said first tube has a diameter equal to the diameter of said second tube.

8. The matched acoustic generator of claim 7 wherein the ratio of the cross sectional area of said pipe to the cross section area of either said tube is is at least 9 and wherein the ratio of the cross sectional area of either tube to the area of either orifice is at least 200.

9. The matched acoustic generator of claim 8 wherein said tubes and said pipe are sufficiently long such that signal attenuation makes the pressure at said orifices independent of the termination of said tubes and said pipe.

10. The matched acoustic generator of claim 9 wherein said tubes and said pipe are closed at the ends thereof.

11. The matched acoustic generator of claim 9 wherein said tubes and said pipe are opened at the ends thereof.

* * * * *